United States Patent

Fukushima et al.

[11] Patent Number: 6,049,442
[45] Date of Patent: Apr. 11, 2000

[54] MULTIPLY-WRITTEN SERVO BURST PATTERNS FOR MINIMIZING POSITION ERROR IN SERVO DISK DRIVES

[75] Inventors: Craig N. Fukushima, Monte Sereno; Karl Arnold Belser, San Jose, both of Calif.

[73] Assignee: International Business Machines Corporation, Armonk, N.Y.

[21] Appl. No.: 08/800,901

[22] Filed: Feb. 12, 1997

[51] Int. Cl.[7] .................................................... G11B 5/596
[52] U.S. Cl. ............................................ 360/77.08; 360/75
[58] Field of Search ................................... 360/77.08, 75

[56] References Cited

U.S. PATENT DOCUMENTS 5,448,429  9/1995  Cribbs et al. ............................... 360/75
5,541,784  7/1996  Cribbs et al. ............................... 360/75

*Primary Examiner*—Andrew L. Sniezek
*Assistant Examiner*—Joseph M Vann
*Attorney, Agent, or Firm*—Sawyer & Associates; Randall J. Bluestone

[57] ABSTRACT

A servo pattern for use on a data storage surface that includes at least one track to minimize position error during positioning of a transducer over the data storage surface. The servo pattern includes a plurality of servo burst fields of constant amplitude for defining a centerline of the track and for determining the position of the transducer. According to the present invention, at least one servo burst field comprises N segments, where $N \geq 2$, and each of the N segments is written with constant amplitude. The amplitude of the at least one servo burst field is then determined as a function of the amplitudes of the N segments.

43 Claims, 4 Drawing Sheets

MULTIPLY-WRITTEN SERVO BURST PATTERNS FOR MINIMIZING POSITION ERROR IN SERVO DISK DRIVES

TECHNICAL FIELD

This patent application is related to servo disk drives utilizing servo burst fields for generating position error signals for measuring head position, and more particularly to a method and system for minimizing position errors in disk drives using multiply-written servo burst patterns.

BACKGROUND

Conventional disk drive assemblies typically include one or more disks, which include a plurality of concentric tracks that are radially displaced from each other on the surface of the disk for storing data. During disk fabrication, servo data is written on the disk by a servowriting process to delineate the centerlines of the tracks. During subsequent disk operations, the servo data is also read by a read/write head to provide information regarding the position of the head with respect to the track. The head position information enables a servo controller to re-align the head over a track when position errors are detected.

During the servowriting process, the servo data is written on the disk as a plurality of servo samples that are radially displaced from one another about the disk. Each sample comprises at least two servo bursts of constant amplitude and frequency (magnetic, reflective, or otherwise) that are recorded on the disk as sequential fields. Typically, the servo bursts are offset from the centerline of track in some particular pattern. One conventional burst pattern is a two-burst pattern, where "A" and "B" bursts are written symmetrically offset from and on respective sides of a track centerline. Another conventional burst pattern is a quad-burst pattern that includes a quad of servo bursts in each servo sample, typically designated as "A", "B", "C", and "D" bursts.

Ideally, the servowriting process would produce tracks that form perfectly concentric annuli about the center of rotation of the disk spindle, and that are spaced at desired track pitch across the disk. Unfortunately, factors such as mechanical vibrations that are asynchronous to disk rotation during the servowriting process, disk defects, and edge/transition noise cause the tracks to form irregular concentric paths and to deviate in track pitch. The track errors produced on the disk are measured as Repeatable Runout (RRO).

The asynchronous component of RRO caused by radial vibrations and motions that occur between the head and disk are asynchronous with disk rotation and asynchronous between adjacent tracks. This results in the track pitch variation which directly contributes to soft and hard errors. Additionally, a noise component of the RRO hinders the detection of events that should inhibit the writing of data onto the disk to prevent further errors.

The RRO is manifested as position error signals (PES) during subsequent disk operations. That is, as the disk rotates and the head samples the servo data, the position of the head relative to the track is measured as position error. The position error signals are input to a servo controller which then uses the signals to generate compensation signals to re-align the head over the centerline of the track. Because the calculation of a position error signal during head tracking uses the boundaries between the servo bursts to define a measured position, and the servo bursts are written with inherent distortion, there is a one-to-one relationship between the "error" in the head-to-disk relative position when a servo burst was written and the "error" of the detected head position during tracking. Due to the presence of RRO errors on the disk, the servo controller may be prevented from correctly maintaining the position of the head over the desired centerline of the track. Accordingly, what is needed is a system and method for minimizing position errors on servo disk drives. The present invention addresses such a need.

SUMMARY

The present invention provides a method and system for providing a servo pattern on a data storage surface that includes at least one track to minimize position error during positioning of a transducer or "head" over the data storage surface and for accommodating disk defects. The servo pattern includes a plurality of servo burst fields of constant amplitude for defining a predetermined position of the at least one track and for determining the position of the transducer. According to the present invention, at least one of the plurality of servo burst fields comprises N segments, where $N \geq 2$ and each of the N segments written is with constant amplitude. The method and system further comprises determining the amplitude of the at least one servo burst field as a function of the amplitudes of the N segments.

According to the system and method disclosed herein, the present invention minimizes position errors on servo disk drives and minimizes RRO and track pitch variation when the servo pattern is written with the same mechanical vibration levels occurring in conventional systems.

DETAILED DESCRIPTION

The present invention relates to a method and system for minimizing position errors in disk drives using multiply-written servo burst patterns. The following description is presented to enable one of ordinary skill in the art to make and use the invention and is provided in the context of specific embodiments. However, various modifications to the preferred embodiment will be readily apparent to those skilled in the art and the generic principles herein may be applied to other embodiments. Thus, the present invention is not intended to be limited to the embodiment shown but is to be accorded the widest scope consistent with the appended claims and with the principles and features described herein.

Figure 1:
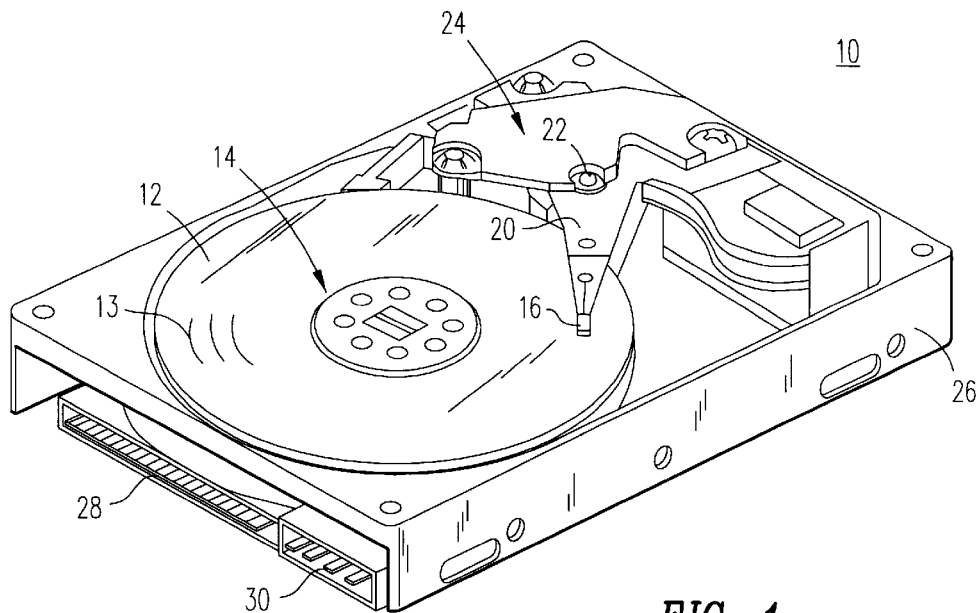
FIG. 1 is a perspective diagram of an illustrative servo head disk assembly operating in accordance with the present invention.

FIG. 1 is a perspective diagram of an illustrative head disk assembly operating in accordance with the present invention. The disk assembly 10 includes one or more disks 12, which are rotated at high-speeds by a spindle motor 14. Although the disk 12 will be explained as having a magnetic recording surface, the disk surface may also comprise other types of recording mediums, such an optical recording medium, for example. The disk 12 includes a plurality of concentric servotracks 13 (hereinafter referred to as tracks) that are radially displaced from each other on the surface of the disk for storing data.

A magnetic transducer or read/write head 16 is suspended over the disk 12 at the end of an actuator arm 20 to transfer data to and from the tracks 13. A voice coil motor 24 moves the arm 20 about a pivot point 22 to thereby position the head 16 radially over the disk 12. A servo control system (not shown), which may be mounted in a frame 26, controls the spindle motor 14, the voice coil motor 24, and the position of the head 16 relative to a particular track 13 on the disk 12. The disk assembly 10 is typically connected to a host system (not shown) through connectors 28 and 30.

Figure 2:
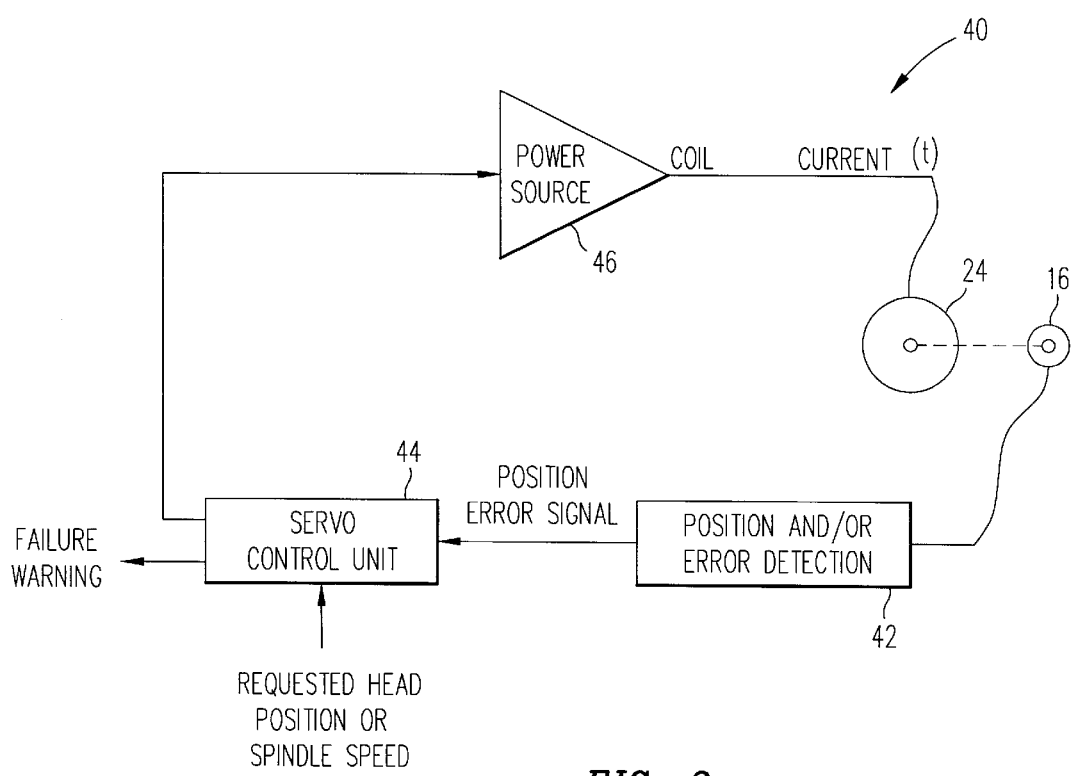
FIG. 2 is a functional block diagram of the servo control system for the servo head disk assembly.

FIG. 2 is a block diagram of the servo control system for the head disk assembly 10. The servo control system 40 includes the head 16 for providing an input to a conventional position and/or speed error detector 42. The error detector 42 provides a position error signal (PES) derived from the head input signal to a servo control unit 44. The servo control unit 44 outputs a corrective signal which is amplified and input as a drive current to the positioning motor of the system 10. The servo control unit 44 typically includes a microprocessor that is programmed to provide position control drive signals for the motor to position the head 16 over the centerline of a desired track 13 in response to the PES. The servo control system 40 may also be programmed to provide an output that warns of irrecoverable error situations, e.g., when the PES falls outside of a specified range.

Figure 3:
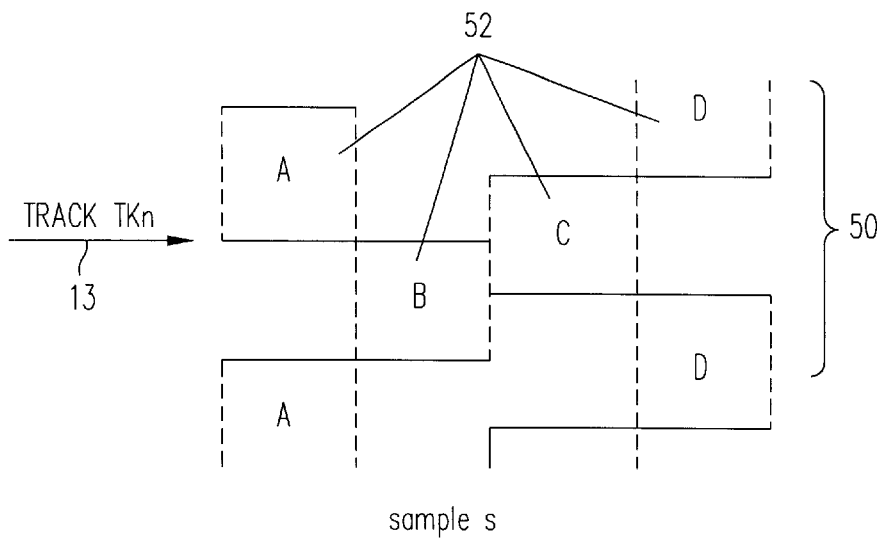
FIG. 3 is a diagram of a conventional quad-burst pattern for providing servo burst fields on the tracks of a disk.

FIG. 3 is a diagram of a conventional quad-burst pattern for providing servo burst fields on the tracks of a disk. In a quad-burst system, each sample 50 about the disk 12 includes four servo burst fields 52 "A", "B", "C", and "D" bursts, where the "C" and "D" bursts are written with a ½ track pitch offset from the "A" and "B" bursts. The "A" and "B" bursts are symmetrically disposed above and below the track, the "C" burst is disposed symmetrically across the track, and the "D" burst is disposed well above the track.

In both the two-burst and quad-burst patterns, the amplitudes of the bursts 52 are sampled by the head 16 during tracking. When the head 16 is positioned exactly over the track, one-half of the "A" burst is read followed by one-half of the "B" burst. As the head 16 moves away from the track centerline, the amplitude of the burst in the direction of misalignment increases, while the amplitude of the other burst decreases. The position error signal is derived by determining the difference between the relative amplitudes (A–B).

Figure 4:
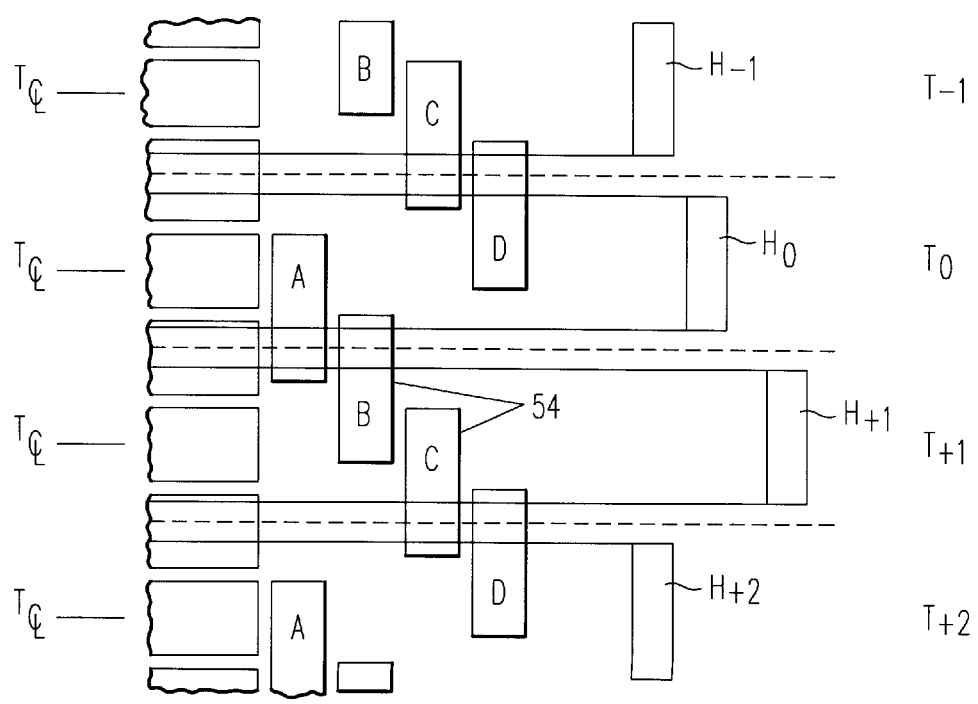
FIG. 4 is a diagram illustrating another example of a conventional quad-burst pattern.

FIG. 4 is a diagram illustrating another example of a conventional quadburst pattern, as disclosed in U.S. Pat. No. 5,381,281. As in the previous example, this quad burst pattern includes four servo burst fields distributed in series along a track sector. The bursts 54, however, are asymmetrically disposed about a track centerline ($T_{cl}$), and each burst 54 is sequentially offset from the adjacent bursts by a radial distance equivalent to one-half of the head width (H). The quad-servo burst pattern is used with a track-following algorithm that determines the difference between the relative amplitudes by the value (A+B)–(C+D).

As part of initial disk manufacturing process servo track writing is performed to write the servo bursts 52 on the disks 12. Although performed by a precision servo writer, variances due for example to vibration, out of round spindle bearings, and nonlinearities in the mechanics of the servo writer may result in errors in the placement of some of the servo bursts 52. Misplacement of the servo bursts 52 contribute to RRO by causing the path of the track centerline to deviate from the nominal track centerline. As track densities increase, the amount of track centerline deviation must be reduced or disk drive reliability will degrade.

The placement and effective shape of the servo bursts 52 can also be affected by surface defects on the disk. Such defects may negate the magnetics or optics of the disk under a servo burst 52, which may render entire servo bursts unusable.

Because the calculation of a position error signal during head tracking uses the boundaries between the servo bursts 52 to define a measured position, and the bursts 52 are written with inherent distortion, there is a one-to-one relationship between the "error" in the head-to-disk relative position when a servo burst was written and the "error" of the detected head position during tracking. That is, when calculating position based on the difference between burst "A" and burst "B", the position of track n is statistically determined by a random variable σ, which is due to head/disk relative motion when burst "B" was written. Therefore, the deviation or error of track n (Tkn) at servo sample (s) is:

Standard deviation(TKn,s)=σ

This projects poorly for high-performance disk assembly systems 10 that have high track densities, where mechanical vibrations dominate.

The present invention is a method and system for minimizing the position error signal derived from the servo information on a disk using multiply-written servo bursts. The present invention will be described in terms of an improvement to the quad-burst servo pattern of FIG. 3. However, those of ordinary skill in the art will understand that the present invention may be applied to any type of servo-burst pattern, such as a two-burst pattern and the quad-burst pattern of FIG. 4, for example.

Figure 5:
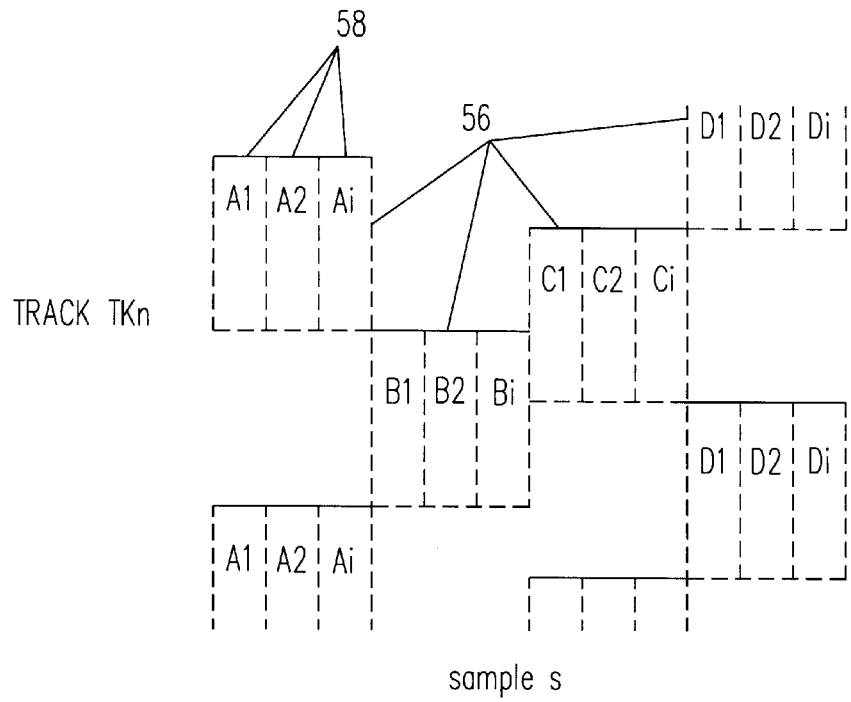
FIG. 5 is a diagram illustrating a multiply-written servo burst pattern in accordance with the present invention.

FIG. 5 is a block diagram illustrating the multiply-written servo burst pattern of the present invention. According to the present invention each of the servo burst 56 of a servo sample is written multiple times to provide multiple segments 58 of constant amplitude and frequency. In the quad-burst pattern shown, each servo burst in servo sample s comprises a plurality of burst segments. Burst "A" comprises segments "A1", "A2", ..., "Ai"; burst "B" comprises segments "B1", "B2", ..., "Bi"; burst "C" comprises segments "C1", "C2", ..., "Ci"; and burst "D" comprises segments "D1", "D2", ...,"Di".

In a preferred embodiment of the present invention, each servo burst 56 is written three times (i=3) to provide three segments 58, although the number of segments 58 used may vary depending on the particular application. The length of each segment 58 also depends on the specific design, although in a preferred embodiment, the combined area of the segments 58 comprising a servo burst 56 is equal to or less than the original area of the servo burst 56 so that the total size of the servo sample s is not increased.

The multiple segments 58 are used to reduce the position error signal caused by random errors (or vibrations asynchronous to rotation) and possibly deterministic errors that are asynchronous with the disk rotation. To reduce the random errors, the segments 58 are written "statistically independent" from each other. For example, in the case of non-repeatable runout (NRRO) during servowriting due to ball bearing defects in the spindle, each segment 58 of burst 56 may be written on a different revolution of the disk. At the ideal limit, the written-in spindle NRRO error resulting in RRO (after demodulation of the quad-burst PES) will be reduced by:

$$\frac{1}{\sqrt{\text{Num. of segments}}}$$

According to the present invention, the position of track n (Tkn), and hence the PES, is determined as a function of the relative voltage amplitudes of the multiple segments 58 in servo sample s, Position (TKn,s)=f(A1, A2, . . . Ai, B1, B2 . . . Bi, . . . , Di), where the values of A1–Ai and B1–Bi are determined by peak detection or area integration.

According to the present invention, the position of track n in the servo sample may be determined from the multiply-written servo bursts "A" and "B" using any of a variety of averaging functions, such as:

Position(TKn,s)=((A1+A2+ . . . Ai)–(B1+B2+ . . . Bi)); and

Position(TKn,s)=((A1–B1)+(A2–B2)+ . . . (Ai–Bi)).

Thus, the averaging process reduces the position error signal during head tracking by $$\frac{\sigma}{\sqrt{i}}$$

for i segments, assuming independence between segments 58.

In another preferred embodiment. the position of track n may be determined by the median amplitude values of the segments 58, rather than the average value, using median functions, such as:

Position(TKn,s)=median (An)–median(Bn); and

Position(TKn,s)=median (An–Bn)

where n=1,2, . . . i.

The multi-segmented servo burst pattern of the present invention may also be used to reduce the effects of disk defects when demodulating track position.

Figure 6:
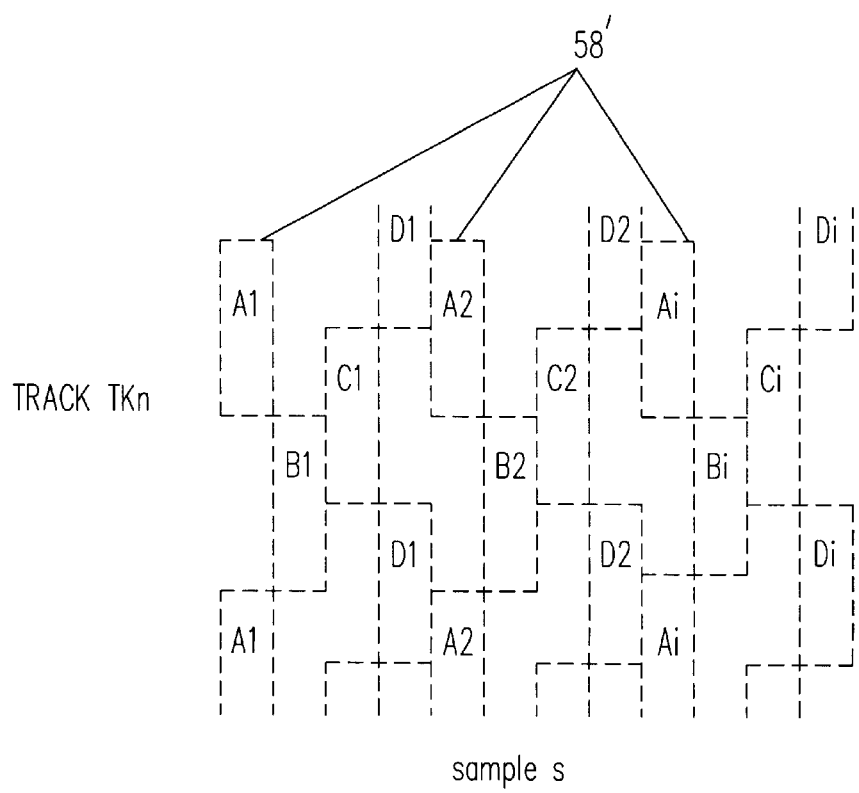
FIGS. 6 and 7 are diagrams illustrating two alternative multi-segment burst patterns for reducing sensitivity of a detected position due to disk defects.
Figure 7:
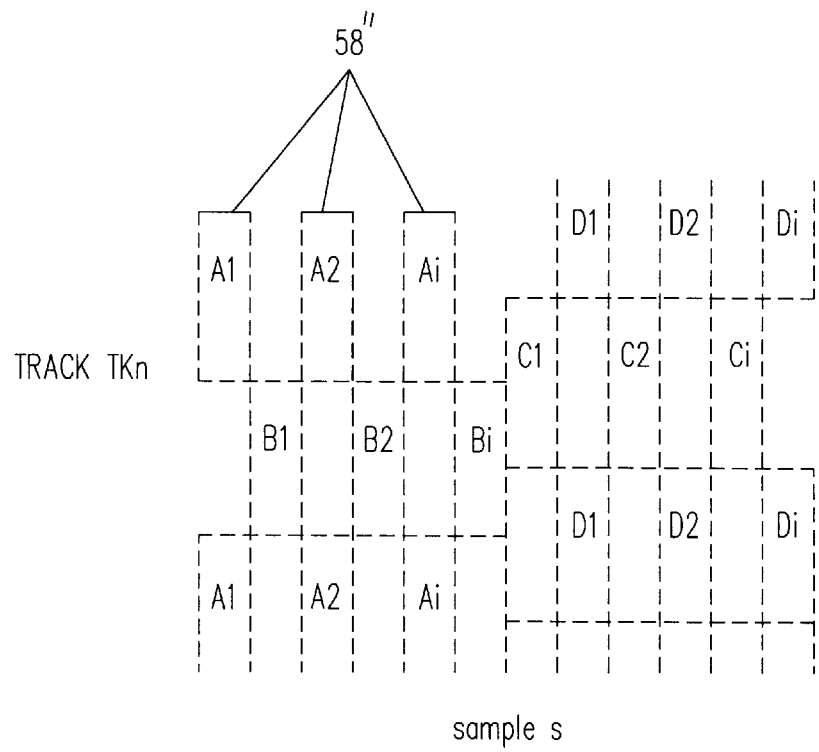

FIGS. 6 and 7 are block diagrams illustrating two alternative multi-segment configurations for reducing sensitivity of a detected position due to disk defects. In these embodiments, the segments belonging to a particular servo burst are physically separated, rather than being physically adjacent. In FIG. 6, the segments 58' are configured such that each sub-set of segments 58' corresponding to burst fields "A", "B", "C", and "D" are arranged according to the pattern (A1, B1, C1, D1), (A2, B2, C2, D2), and so on, as in the original quad-burst pattern.

In FIG. 7, the segments 58" are configured such that the segments 58" corresponding to one burst field are interspersed with the segments 58" corresponding to the immediately following burst field. More particularly, the segments 58" corresponding to the quad-burst field "A" are interspersed with the segments 58" corresponding to a quad-burst field "B"as follows: A1, B1, A2, B2, . . . , Ai, Bi. And the segments 58" corresponding to the quad-burst field "C" are interspersed with the segments 58" corresponding to a quad-burst field "D" as follows: C1, D1, C2, D2, Ci, Di.

In the servo patterns of FIGS. 6 and 7, if a defect renders one or more segments of a burst field unusable, the amplitude of that or those burst fields may be obtained from a remaining subset of the segments of the burst field to provide additional PES robustness. This is in contrast to the prior art burst fields wherein a defect on the disk may render the entire burst field unusable. The amplitude of a burst is accomplished by using a "middle value" (i ≧3 segments per burst) of the amplitudes from each segment representing the burst. To obtain a middle value, one or more of each of the high and low amplitudes from the i segments are discarded and the remaining amplitudes are averaged to compute the amplitude of the burst; the mean of any subset of the remaining values may also be used.

Figure 8:
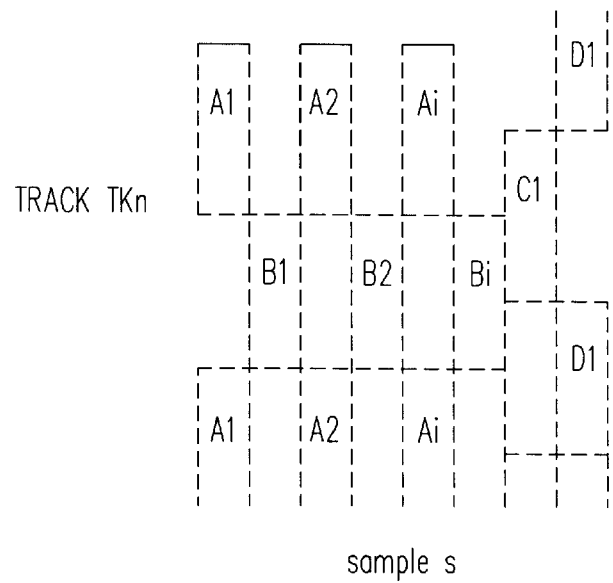
FIG. 8 is a diagram illustrating a servo pattern that reduces the area of a quad-burst pattern in accordance with the present invention.

According to the present invention, the servo pattern of the present invention may also be used to reduce the disk area required for a quad-burst pattern, as shown in FIG. 8.

FIG. 8 is a block diagram illustrating a servo pattern that reduces the area of a quad-burst pattern. The servo pattern is similar to the servo pattern of FIG. 7 where the segments 58" of one burst are interspersed with the segments 58" of the immediately following burst. However, since the "C" and "D" bursts in a quad-burst pattern are only used to determine head position when the head is offtrack, only one segment of the "C" and "D" bursts are provided in the present pattern to save space.

A multiply-written burst pattern has been disclosed that minimizes position error on a servo disk and can accommodate disk defects. The multiply-written burst pattern of the present invention also reduces track follow RRO and track pitch variation that occur, e.g., due to mechanical vibration levels in disk assemblies.

Although the system and method have been described in accordance with the embodiments shown, one of ordinary skill in the art will readily recognize that there could be variations to the embodiments and those variations would be within the spirit and scope of the above-described system and method. For example, the multiply-written servo burst may be used to determine a predetermined portion of a track, such as the top or bottom of the track, rather than the centerline. Accordingly, many modifications may be made by one of ordinary skill in the art without departing from the spirit and scope of the appended claims.

What is claimed is:

1. A servo pattern for use on a rotating data storage surface to minimize position error during positioning of a transducer over the data storage surface, the data storage surface including at least one track, the servo pattern comprising:
a plurality of servo burst fields for defining a predetermined position of the at least one track and for determining the position of the transducer, wherein at least one of the plurality of servo burst fields comprises N segments, where N≧2, each of the N segments written with constant amplitude, and wherein the amplitude of the at least one servo burst field is determined as a function of the amplitudes of its N segments.

2. The servo pattern of claim 1 wherein each of the N segments of the at least one servo burst field is written during a different revolution of the data storage surface.

3. The servo pattern of claim 1 wherein the plurality of servo burst fields includes servo burst field "A" and servo burst field "B", and wherein the servo burst field "A" comprises segments A1, A2, . . . , Ai and servo burst field "B" comprises segments B1, B2, . . . , Bi, where i=N.

4. The servo pattern of claim 3 wherein the plurality of servo burst fields further comprises servo burst field "C" and servo burst field "D", and wherein the servo burst field "C" comprises segments C1, C2, . . . , Ci and servo burst field "D" comprises segments D1, D2, . . . , Di, where i=N.

5. The servo pattern of claim 4 wherein the servo pattern comprises the sequence (A1, B1, C1, D1), (A2, B2, C2, D2), . . . (Ai, Bi, Ci, Di).

6. The servo pattern of claim 4 wherein the servo pattern comprises the sequence (A1, B1), (A2, B2), ... (Ai, Bi), C, D.

7. The servo pattern of claim 4 wherein the servo pattern comprises the sequence (A1, B1), (A2, B2), ... (Ai, Bi), (C1, D1), (C2, D2), ... (Ci, Di).

8. The servo pattern of claim 3 wherein servo burst field "A" has an area of size X, and the segments of servo burst "A" have a combined area of size Y, such that Y ≦X.

9. The servo pattern of claim 3 wherein the amplitude of the at least one servo burst field is determined by averaging the amplitudes of the N segments.

10. The servo pattern of claim 3 wherein the centerline of the track (TK) is determined from the servo burst fields "A" and "B" by averaging the amplitudes of the segments using the function:

TK=((A1+A2+ ... Ai)−(B1+B2+ ... Bi)).

11. The servo pattern of claim 3 wherein each of the segments comprising servo burst field "A" is interspersed with the segments comprising servo burst "B" such that the servo pattern comprises the sequence A1, B1, A2, B2, ..., Ai, Bi.

12. A The servo pattern of claim 3 wherein the centerline of the track (TK) is determined from the servo burst fields "A" and "B" by median amplitude values of the segments using the function:

TK=median ($A_m$)−median ($B_m$), where m=1, ..., n.

13. The servo pattern of claim 3 wherein the centerline of the track (TK) is determined from the servo burst fields "A" and "B" by median amplitude values of the segments using the function:

TK=median ($A_m$−$B_m$), where m=1, ..., n.

14. The servo pattern of claim 1 wherein the amplitude of the at least one servo burst field is determined using an average value of the amplitudes of the N segments, wherein the average value is obtained by discarding at least one high and at least one low segment amplitude and averaging the amplitudes of a subset of any remaining N segments.

15. The servo pattern of claim 1 wherein the amplitude of the at least one servo burst field is determined by a mean value of the amplitudes of the N segments.

16. A disk drive assembly, comprising:
a rotatable storage surface, the rotatable storage surface including a plurality of tracks for storing data;
a head suspended over the rotatable storage surface for transferring data with respect to the plurality of tracks;
positioning means for controlling the position of the head over the plurality of tracks; and
at least one servo pattern written on each one of the plurality of tracks for defining a centerline for each one of the plurality of tracks and for providing the positioning means with head position information, each one of the servo patterns including at least two servo bursts fields, each servo burst field comprising multiple segments of constant amplitude, wherein the positioning means determines the amplitude of each servo burst field by a function of the respective amplitudes of the multiple segments comprising each one of the servo burst fields.

17. The disk drive assembly of claim 16 wherein the at least two servo bursts fields each comprise servo burst field "A" and servo burst field "B", and wherein the servo burst field "A" comprises segments A1, A2, ..., Ai and servo burst field "B" comprises segments B1, B2, ..., Bi, where i=N.

18. The disk drive assembly of claim 17 wherein the at least two servo burst fields each further comprise servo burst field "C" and servo burst field "D", and wherein the servo burst field "C" comprises segments C1, C2, ..., Ci and servo burst field "D" comprises segments D1, D2, ..., Di, where i=N.

19. The disk drive assembly of claim 18 wherein the servo pattern comprises the sequence (A1, B1, C1, D1), (A2, B2, C2, D2), ... (Ai, Bi, Ci, Di).

20. The disk drive assembly of claim 18 wherein the servo pattern comprises the sequence (A1, B1), (A2, B2), ... (Ai, Bi), C, D.

21. The disk drive assembly of claim 18 wherein the servo pattern comprises the sequence (A1, B1), (A2, B2), ... (Ai, Bi), (C1, D1), (C2, D2), ... (Ci, Di).

22. The disk drive assembly of claim 18 wherein the centerline of the track (TK) is determined from the servo burst fields "A" and "B" by median amplitude values of the segments using the function:

TK=median ($A_m$−$B_m$), where m=1, ..., n.

23. The disk drive assembly of claim 17 wherein each of the segments comprising servo burst field "A" is interspersed with the segments comprising servo burst "B" such that the servo pattern comprises the sequence A1, B1, A2, B2, ..., Ai, Bi.

24. The disk drive assembly of claim 17 wherein a position of the track (TK) is determined from the servo burst fields "A" and "B" by averaging the amplitudes of the respective segments using the function:

TK=((A1+A2+ ... Ai)−(B1+B2+ ... Bi)).

25. The disk drive assembly of claim 18 wherein the centerline of the track (TK) is determined from the servo burst fields "A" and "B" by median amplitude values of the segments using the function:

TK=median ($A_m$)−median ($B_m$), where m=1, ..., n.

26. The disk drive assembly of claim 16 wherein the amplitudes of each of the at least two servo burst fields is determined by averaging the respective amplitudes of the multiple segments comprising the servo burst fields.

27. The disk drive assembly of claim 16 wherein the amplitudes of each the at least two servo burst fields is determined by the respective mean values of the amplitudes of the multiple segments comprising the servo burst fields.

28. The disk drive assembly of claim 16 wherein the amplitudes of each of the at least two servo burst fields is determined using an average value of the amplitudes of the multiple segments comprising the servo burst fields, wherein the average value is obtained by discarding at least one high and at least one low segment amplitudes and averaging the amplitudes of a subset of any remaining N segments.

29. A method for providing a servo pattern to minimize position error during positioning of a transducer over a rotating data storage surface, the data storage surface including at least one track, the method comprising the steps of:
a) writing a plurality of servo burst fields on the data storage surface to define a predetermined position of the track, wherein at least one of the plurality of servo burst fields is written with N segments of constant amplitude; and
b) during the positioning of the transducer, determining the amplitude of the at least one servo burst field using a function of the amplitudes of the N segments.

30. The method of claim 29 wherein step (a) further includes the step of:
writing each of the N segments of the at least one servo burst field during a different revolution of the data storage surface.

31. The method of claim 29 wherein step (a) further includes the step of:

writing each of the plurality of servo burst fields to include servo burst field "A" and servo burst field "B", wherein the servo burst field "A" comprises segments A1, A2, . . . , Ai and servo burst field "B" comprises segments B1, B2, . . . , Bi, where i=N.

32. The method of claim 31 wherein step (a) further includes the step of:

writing each of the plurality of servo burst fields to further include servo burst field "C" and servo burst field "D", wherein the servo burst field "C" comprises segments C1, C2, . . . , Ci and servo burst field "D" comprises segments D1, D2, . . . , Di, where i=N.

33. The method of claim 32 wherein step (a) further includes the step of:

interspersing each of the segments comprising servo burst fields "A" "B", "C" and "D", such that the servo pattern comprises the sequence (A1, B1, C1, D1), (A2, B2, C2, D2), . . . (Ai, Bi, Ci, Di).

34. The method of claim 32 wherein step (a) further includes the step of:

interspersing each of the segments comprising servo burst field "A" with the segments comprising servo burst "B" such that the servo pattern comprises the sequence (A1, B1), (A2, B2), . . . (Ai, Bi), C, D.

35. The method of claim 32 wherein step (a) further includes the step of:

interspersing each of the segments comprising servo burst fields "A", "B", "C", and "D" such that the servo pattern comprises the sequence (A1, B1), (A2, B2), . . . (Ai, Bi), (C1, D1), (C2, D2), . . . (Ci, Di).

36. The method of claim 31 wherein step (a) further includes the step of:

writing servo burst field "A" with an area of size X, and writing the segments of servo burst "A" such that the segments of servo burst "A" have a combined area of size Y where Y$\leq$X.

37. The method of claim 31 wherein step (b) further includes the step of:

determining the centerline of the track (TK) from the servo burst fields "A" and "B" by averaging the amplitudes of the segments using the function:

TK=((A1+A2+ . . . Ai)−(B1+B2+ . . . Bi)).

38. The method of claim 31 wherein step (a) further includes the step of:

interspersing each of the segments comprising servo burst field "A" with the segments comprising servo burst "B" such that the servo pattern comprises the sequence A1, B1, A2, B2, . . . , Ai, Bi.

39. The method of claim 31 wherein step (b) further includes the step of:

determining the centerline of the track (TK) from the servo burst fields "A" and "B" by median amplitude values of the segments using the function:

TK=median $(A_m)$−median $(B_m)$, where m=1, . . . , n.

40. The method of claim 31 wherein step (b) further includes the step of:

determining the centerline of the track (TK) from the servo burst fields "A" and "B" by median amplitude values of the segments using the function:

TK=median $(A_m-B_m)$, where m=1, . . . , n.

41. The method of claim 29 wherein step (b) further includes the step of:

determining the amplitude of the at least one servo burst field by averaging the amplitudes of the N segments.

42. The method of claim 29 wherein step (b) further includes the step of:

determining the amplitude of the at least one servo burst field using an average value of the amplitudes of the N segments, wherein the average value is obtained by discarding high and low segment amplitudes and averaging the amplitudes of a subset of any remaining N segments.

43. The method of claim 31 wherein step (b) further includes the step of:

determining the amplitude of the at least one servo burst field by using a mean value of the amplitudes of the N segments.

* * * * *